United States Patent [19]

Elbaum

[11] Patent Number: 5,083,026
[45] Date of Patent: Jan. 21, 1992

[54] METHOD, APPARATUS AND APPLICATIONS OF THE QUANTITATION OF MULTIPLE GAMMA-PHOTON PRODUCING ISOTOPES WITH INCREASED SENSITIVITY

[76] Inventor: Danev Elbaum, Box 450, Awosting Rd., Pine Bush, N.Y. 12566

[21] Appl. No.: 478,945

[22] Filed: Feb. 12, 1990

[51] Int. Cl.[5] .................. G01T 1/178; G01T 1/202
[52] U.S. Cl. .................. 250/369; 250/367; 250/364
[58] Field of Search .............. 250/369, 367, 364, 303

[56] References Cited

U.S. PATENT DOCUMENTS

| | | | |
|---|---|---|---|
| 3,979,593 | 9/1976 | Spragg et al. | 250/364 |
| 4,395,634 | 7/1983 | Böhme | 250/367 |
| 4,495,420 | 1/1985 | Chudy et al. | 250/367 |
| 4,833,326 | 5/1989 | Valenta et al. | 250/369 |

Primary Examiner—Jack I. Berman
Assistant Examiner—Richard Hanig

[57] ABSTRACT

Prior art methods for quantitation of radioisotopically labeled molecules employ isotopes emitting a single electron, positron or gamma-photon. Their sensitivity is limited by background events which cannot be distinguished from the decays of the isotopic label. There are isotopes decaying with concurrent production of a positron and a gamma photon, with a subsequent positron-electron annihilation producing paired 511 keV gammas with opposite momenta. The Coincident Gamma-photon Detector (CGD) registers a count when coincident gamma-photons of known energies are detected. When set to the triple gamma signature of a particular isotope, the CGD achieves exceptional background rejection with resultant improved capacities to quantitate minute traces of the isotope. With the increased sensitivity thus achieved, there are advantageous novel uses of the multiple gamma producing isotopes, for the quantitation of molecules in which they can be incorporating or adducted to.

30 Claims, 13 Drawing Sheets

METHOD, APPARATUS AND APPLICATIONS OF THE QUANTITATION OF MULTIPLE GAMMA-PHOTON PRODUCING ISOTOPES WITH INCREASED SENSITIVITY

BACKGROUND OF THE INVENTION

1. Field of the Invention

This invention relates to improvements in the art of quantitating radioisotopes whose decay culminates in a production of multiple gamma-photons, and the quantitation of molecules with these isotopes incorporated. The order of magnitude improvements result from an appropriate choice of isotopes and novel apparatus, a Coincident Gamma-photon Detector (CGD), which together achieve an excellent rejection of background radiation events. With the greatly reduced background counts there are advantageous usages of several isotopes which have not previously been utilized for molecular quantitations.

2. Prior Art

The following patents and application describe various known apparatus and methods of detection of radiation.

| Name | Date | Number |
|---|---|---|
| Kalish | 3-16-76 | U.S. Pat. No. 3,944,832 |
| Wilkinson | 5-4-76 | U.S. Pat. No. 3,954,739 |
| Blumberg et al | 2-19-80 | U.S. Pat. No. 4,189,464 |
| Kaul et al | 11-25-80 | U.S. Pat. No. 4,235,864 |
| Nickles | 12-23-86 | U.S. Pat. No. 4,631,410 |
| Mullani | 2-10-87 | U.S. Pat. No. 4,642,464 |
| Wong | 3-3-87 | U.S. Pat. No. 4,647,779 |
| Curtiss et al | 6-30-87 | U.S. Pat. No. 4,677,057 |
| Karcher et al | 6-14-88 | U.S. Pat. No. 4,751,389 |
| Ginsberg et al | 4-11-89 | U.S. Pat. No. 4,802,505 |
| East German (Abstract) | | 241,788-A |

Radioisotopes are detected through the absorption of the energies of decay products. Scintillators are often used to convert the energy of the emitted particle into a burst of low energy photons, which are collected by photodetectors. More specifically low cost organic scintillators (plastic or liquid) are used in prior-art instruments. Their advantages are low cost, a capacity to use complex shapes and fast timing. The major disadvantages excluding their use in the CGD are low gamma stopping power and mediocre energy resolution. Signal amplification and analysis commonly precede the final registration of a decay count.

The sources of background radiation which trigger radiation counters include cosmic rays, radon gas and the traces of man-made and natural radioisotopes contaminating many materials used in radiation counters. Highest in the latter category are carbon-14 and potassium-40. The background of registered counts without a sample present sets a minimum for the amount of radioisotope which can be detected or must be utilized to achieve a valid quantitative assay. There must be enough sample radioactivity to achieve a statistically significant sample count rate over that of the background count. The backgrounds registered by current commercial instruments are in the range of 15-60 counts per minute.

The sensitivity of an assay is thus improved by any measures which reduce background counts. With increased sensitivity shorter counting times and/or reduced amounts of a sample will suffice for a radioisotopic assays. There will be corresponding increases in sample throughput, decreased radiation hazards and less radioactive waste to dispose of.

There is considerable prior art for the reduction of system background counts. Shielding the sample chamber and critical detector components from exterior radiation is a common measure. Very pure shielding materials are used to minimize their contribution of contaminating radioisotopes. Parameters of detection systems can be set to reject background events falling outside of the energy window(s) characteristic of the emissions of a known isotope. For example gamma emitting isotopes have nuclei which drop to a lower angular momentum state(s) with emission of a monoenergetic gamma-photon. In a typical gamma counter, the scintillator converts the gamma to a burst of lower energy photons which are absorbed by a photodetector and the energy quantitated with associated electronics. Energy depositions outside of the energy window of the isotope's gamma are not counted. To recognize background due to cosmic rays, a detector external to the sample chamber shield can be used in conjunction with the sample chamber's instruments. The external veto counter rejects a coincident count from the sample chamber.

Using these prior-art techniques a very low background apparatus has been constructed which reduces backgrounds to a few counts per hour. To achieve backgrounds of a few counts per day, the detectors are placed deep underground. The state of the art in ultra-low background counting is represented for example in reports of R.L. Brodzinski et al.. NIM A239, (1985) 207. and R.L. Brodzinski et al., "Further reduction of radioactive backgrounds in ultrasensitive germanium spectrometers," NIM, in press. Only three such instruments now exist worldwide because the system costs more than $1,000,000. They are far too costly for routine molecular quantitation tasks. Moreover they are not optimized for particular isotopes and are not designed for the high throughput needs of the chemical, biological of commercial diagnostic laboratories.

3. Invention Development

In the development of this invention, information was gathered with one of the ultra-low background systems. A particular interest was the background intrinsic to body fluids. Assaying biological macromolecules is a projected major area of application of this invention. With a 50 ml blood sample, it was observed with the gamma counting instrumentation that:

a) the background increases rapidly for low energies, $E \leq 300$ keV (kilo electron volts), with indications of a few discrete lines with count rates of a few hundred counts per hour;

b) the background is a few counts per hour in the range $300 \leq E \leq 500$ keV;

c) there is a 511 keV peak of a few tens of counts per hour, attributable to positrons in the sample producing 511 keV annihilation gamma pairs;

d) the background in the range $600 \leq E \leq 1000$ keV was below a count per hour.

e) there is a background attributable to potassium-40 with count rates of the order of 100 counts per hour.

Background can be rejected by the use of time coincidence methods, as achieved for example in prior-art uses of positron emitting isotopes. This decay signature is used in the rejection of single gamma background events, as employed for example in positron emission tomography. However, the evident presence in blood of significant traces of positron emitting isotopes set an undesirable high background for rejections employing only double coincidence.

Advantage can be taken of the existence of isotopes with more complex decay signatures. There are isotopes whose decay with the concurrent production of more than two gamma-photons. Among them there is a substantial sub-family which initiate decay through the emission of a positron and leave the nucleus in an excited angular momentum state, leading to prompt gamma emission. This solitary gamma plus the two annihilation photons (E = 511 keV) derived from a positron-electron interaction yields a triple of coincident gammas with known energies. Thus the net decay signature is a production of the back-to-back 511 keV gamma pair and a solitary gamma with a non-correlated emission direction and distinct energy (for some of the isotopes the solitary gammas can have a few different energies). The average delay between the appearance of the annihilation pair and the solitary gamma generally is much less than 100 nsec (nanoseconds). Typically it is about 0.1 nsec within liquids or solids and 10-100 nsec in air at one atmosphere of pressure.

For brevity, members of this family will be termed "triple gamma isotopes." As chemical reagents they include carbon, nitrogen, oxygen, fluorine, bromine and iodine. The chemistry of iodine is particularly useful. Through simple adduction at double covalent bonds such as $>C=C<$ and $-N=C<$, iodine is used to radioisotopically label preformed macromolecules including ribonucleic acids, deoxyribonucleic acids, carbohydrates and proteins. The single-gammaemitters iodine-125 and iodine-131 are extensively utilized to label antibodies and/or antigens for the radioimmunoassay (RIA) procedures of biomedical research and medical diagnostics. Immunoassays utilize the exquisite binding specificities of antibodies to quantitate either antigens or antibodies, and the quantitations can proceed in complex body fluids or on tissue samples. RIA is the most sensitive of the immunoassay techniques. Methodologies are well described in: A.E. Botton, W.H. Hunter, "Radioimmunoassay and related methods," page 26.1-26.55 in the Handbook of Experimental Immunology, ed. L.A. Herzenberg et al., publisher Blackwell Scientific, 1984 and D. Freifelder. "Physical Biochemistry". chpt. 10, publisher W.H. Freeman, 1977, D. Bereitag, K.H. Voigt. in Treatise on Analytical Chemistry. Part I, p. 285-333, publisher J. Wiley & Sons. Triple gamma emitting isotopes have not been previously utilized for RIA procedures, and more generally, for sensitive quantitations of molecules.

The sources of background affecting the quantitation of triple gamma isotopes was explored with pilot instrumentation. A three detector assembly was used. Each detector had a NaI(Tl) scintillator coupled to two inch photodetectors, Ortec preamplifiers and spectroscopy preamplifiers, appropriate signal delay lines and a high voltage power supply. No external shielding was employed. One detector served as a master to initiate a coincidence interval of 50 nsec. Three coincidence counting modes were implemented: (1) to count all events registered by the master; (2) to count a master event if accompanied by a coincident event in another counter; and to count a master event if accompanied by coincident events in the two other detectors. In this third mode, two of the energy windows were $511\pm50$ keV. The energy spectrum was measured for each coincidence mode using multichannel analyzers.

Figure 1:
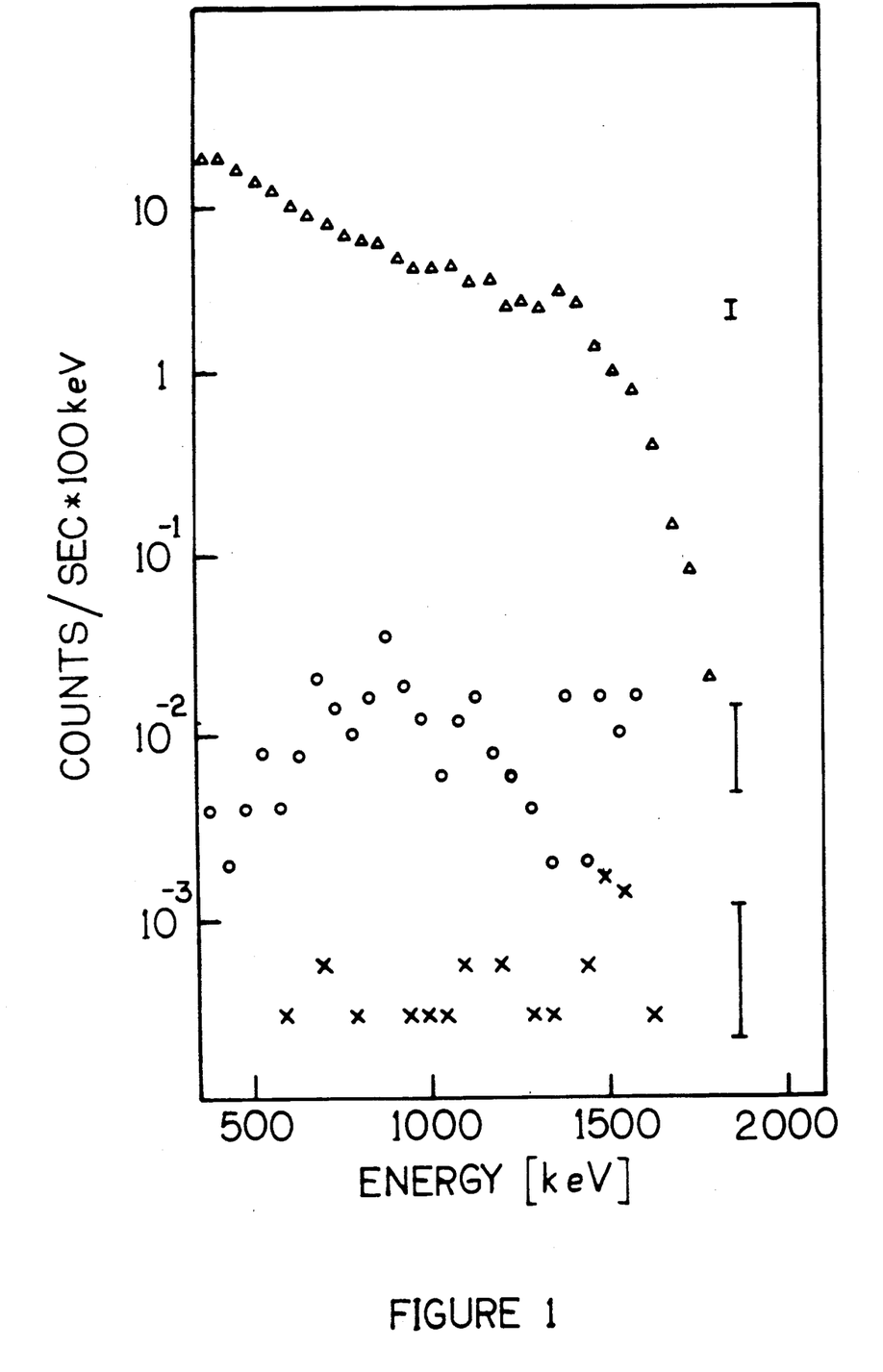
FIG. 1a is a plot of accepted counts versus total energy of the radiation with 50 ml of normal blood measured in the sample chamber, under event acceptance conditions of: Δ—no coincidence; ◯—double coincidence; and x—triple coincidence.
FIG. 1b is a plot with triple coincidence with: ☐—⊔ air; ◯—◯ normal blood; and x—normal urine.
Figure 1A:
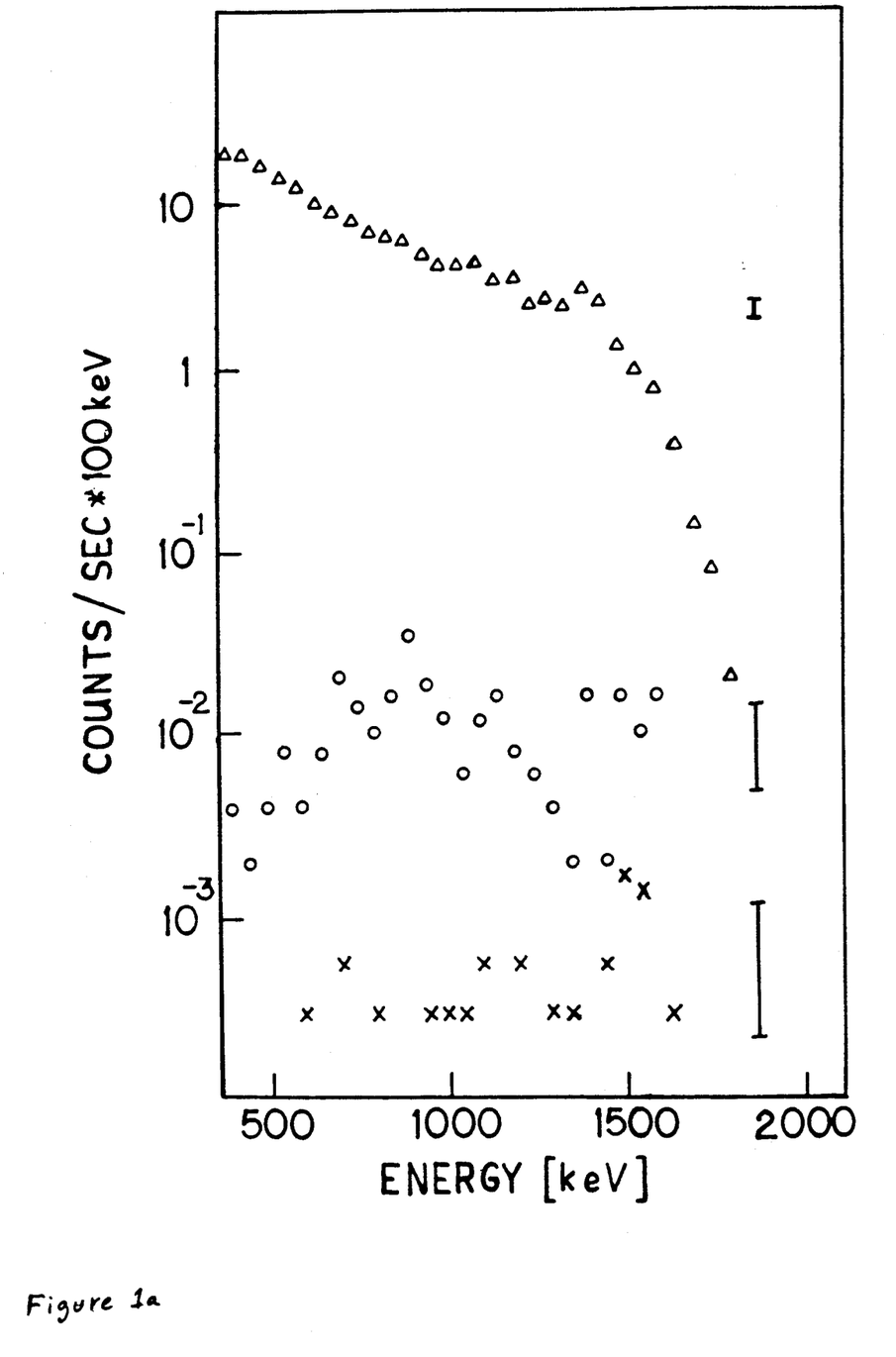

For the experiment of FIG. 1a the 50 ml liquid sample was blood. This trial represents a worst case bioassay situation because of the presence of the single-gammaemitting potassium-40 in biological fluids and tissues. A major projected use of the invention is the sensitive quantitation of biological macromolecules in the presence of body fluids. With no coincidence requirement the energy spectrum reflects the background, dominated by potassium-40 gammas and their lower energy Compton scattering events. With the double coincidence requirement, the background count is reduced about 100 fold. These counts are attributed predominantly to traces of positron emitting isotopes. The triple coincidence mode corresponds to a selective acceptance condition for triple gamma producing isotopes. The accepted count is decreased about another 50 fold, as compared to the dual coincidence mode.

Figure 1B:
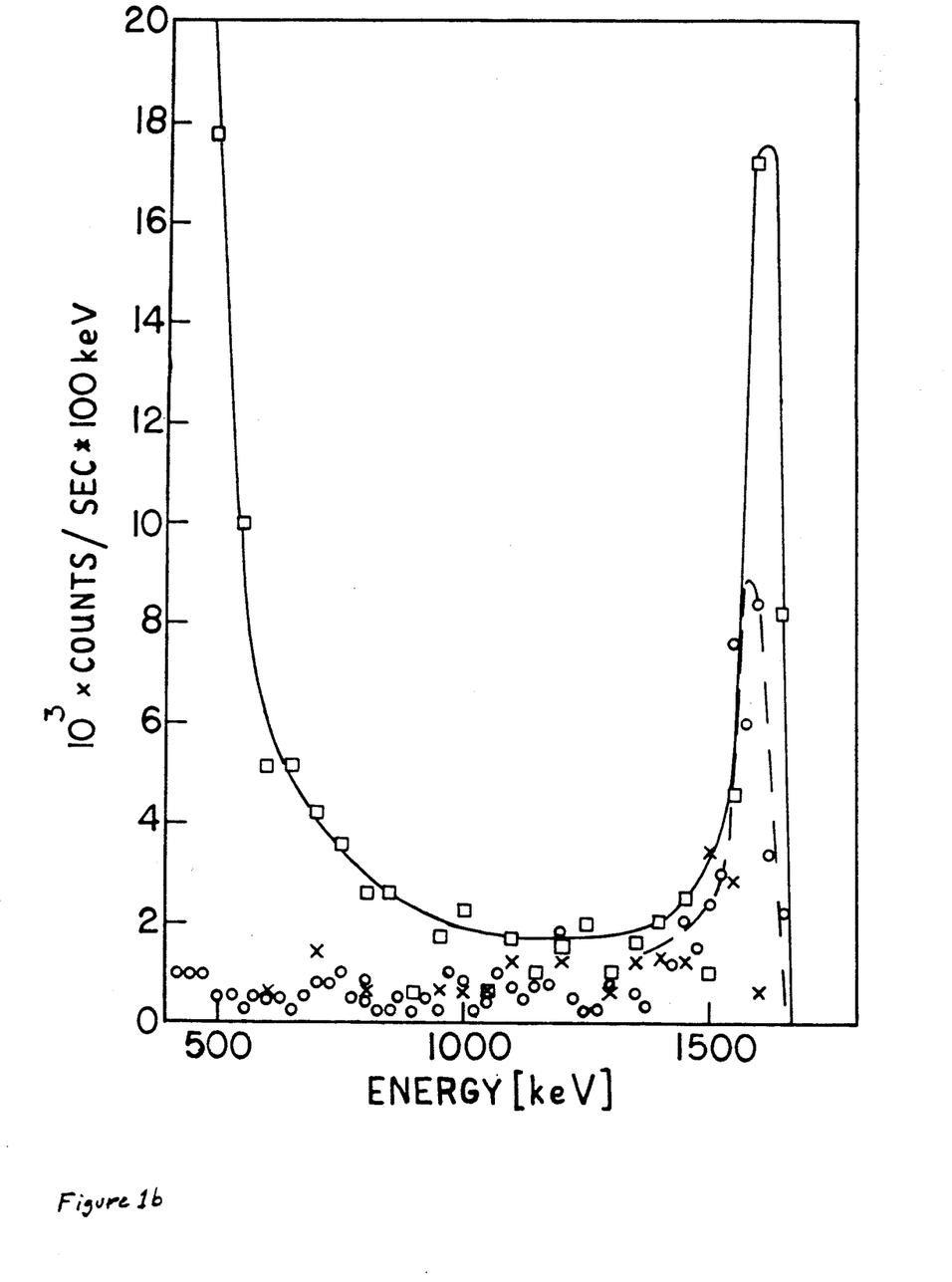

The peak at 1550 keV is attributed to 510 keV gammas from ubiquitous radon gas which are accidently coincident with annihilation gamma pairs derived from traces of positron emitting isotopes, as $510+2\times511=1532$ keV. This peak doubled in height when air with its radon replaced 50 ml of blood or urine during acquisition of a triple coincidence spectrum, as shown in FIG. 1b. With the air sample an increasing background towards lower energies is attributed to Compton scattered gammas, which contribute to accidental gamma triples arriving within the 50 nsec coincident interval. This contribution is quenched by the presence of more absorbing blood or urine.

This proof of concept experiment illustrates that excellent background rejection can be achieved with a CGD, when only events indistinguishable from a triple gamma signature are counted. These results and those obtained with the ultra-low background system guided design of this invention.

The experimental results also guide choices of triple gamma isotopes most suitable for radioisotopic labeling of molecules. Preferably, the solitary gamma should have an energy distinguishable from the 510 keV radon-222 gamma, so that the gamma background from radon can be most effectively rejected. Furthermore, the energy spectrum from blood obtained with the ultra-low background counter recommends an energy greater than 300 keV and preferably in the 600-1000 keV range. A survey of over 1000 known isotopes was made for triple gamma isotopes which satisfied the above criteria. Also a halflife of at a least a few hours is desirable to accommodate production, radioisotopic labeling chemistries and distribution to users. Several suitable isotopes are thus available:

| Isotope | halflife | E in meV of solitary gamma(s) |
|---|---|---|
| selenium-137 | 7.1 hours | 1.31, 0.86 |
| bromine-76 | 17 hours | 1.21, 0.75, 0.33 |
| germanium-69 | 40 hours | 0.576 |
| bromine-77 | 57 hours | 0.813, 0.520, 0.237 |
| iodine-124 | 4.2 days | 0.72, 0.6 |
| iodine-126 | 13 days | 0.64, 0.395 |

The iodine isotopes with their longer halflives and simple adduction chemistries are particularly well suited for use as radioisotopic labels for other molecules. The preferred embodiment of the CGD is optimized for iodine-124 quantitation. Among the bromine and iodine isotopes the best background rejection can be achieved with the highest energy E = 0.72 keV gamma of iodine-124.

The preferred embodiment of the CGD is optimized to the needs of the RIA with iodine isotopes. Quantitations will be feasible much below the level of the backgrounds of contemporary assay systems. Thus diagnostic detections of antigens (such as cancer or HIV virus indicators) will be much more sensitive.

More generally assays of the molecules incorporating the triple gamma isotopes can be performed with much higher sensitivity. At least a thousand fold reduction in the minimal amount of radioisotope necessary for an assay will be achievable with CGD instruments, and corresponds to less than a nanocurie of triple gamma isotope. The corresponding amount of radiation is less than that from radioactive contaminants of television screens or the drinking water in areas of the Rocky Mountains.

There is a novel application area. With the minimal necessary quantity of triple gamma isotope for assays performed in body fluids, the amount of energy deposited by a triple gamma isotope is much less than that of the resident radioisotopes, primarily potassium-40. Thus when desirable certain biochemical reaction component of an assay could be performed within the body, with an insignificant added radiological burden to the organism/patient. Subsequently the appropriately mounted sample would be withdrawn for radioisotopic quantitation in a CGD. For a single example, an antibody for the AID (or HIV) virus would be coupled to the surface of a flexible, thin plastic rod or ribbon. The binding of its conjugate iodine-126 labeled viral antigen would prepare the rod with its antibody-antigen complex for a displacement assay. When inserted into a blood vessel or body cavity, the disassociation of the iodine-126-antigen from the antibody would be accelerated, by the presence of homologous antigen competing for the two binding sites of each antibody. After a chosen interval, the plastic would be withdrawn and its retained iodine-126 antibody quantitated in a CGD. From the retention, time in body fluid and calibration parameters, the concentration of the viral antigen in the body fluid would be calculated. The great value in such in situ assays would be avoidance of numerous artifacts which can accompany removal of biological specimens from their natural environment.

It is evident that quantitations utilizing a CGD are entirely distinct from usages of positron emitting isotopes in the imaging applications of Positron Emission Tomography (PET). A CGD will be a compact instrument, accommodate micro-samples, and be suitable for isotopes with long half lives. PET systems occupy a few rooms, are designed to accommodate people and require very short lived isotopes. A CGD assay will require about a nanocurie of isotope while PET imaging runs require tens of millicuries of isotope. The CGD uses only several scintillators while PET requires hundreds. The difference in the channels of required electronics leads to different technological challenges and design trade offs.

SUMMARY OF THE INVENTION

The method of the invention is the improved quantitation of isotopes decaying with concurrent emission of a positron and a gamma-photon, which culminates in the production of three gammas of known energy with two being a gamma pair resulting from positron-electron annihilation. The improvement results from the rejection of background events which are distinguishable from the decay signature of the known triple gamma isotope in the sample, with a concomitant capacity to achieve more sensitive quantitations of the isotope. This method was made possible by the results described above in Invention Development which provide the background spectra of blood, urine and air without added radioisotopes. The knowledge of the background spectrum permits the choice of the triple gamma isotope(s) which both: (1) satisfy practical requirements of the radioisotopic labeling and (2) has a suitably distinguishing decay signature. A candidate decay of the known isotope is counted only if the instrument of the invention cannot distinguish the event from a triple gamma decay as determined by each of the three following criteria:

1. There is coincident activation of three gamma detectors within an interval compatible with the known temporal statistics of the isotopic decay: typically an interval of about 10 nanoseconds and generally much less than 100 nanoseconds;
2. The gamma energies are compatible with those of the sample's isotope comprising two 511 keV annihilation gammas and that of the solitary gamma(s) emitting during the transition in angular momentum state of the daughter nucleus;
3. The angular distribution of the three candidate gammas is compatible with that of an opposed 511 keV annihilation pair, and the third directionally-noncorrelated gamma.

This third criterion serves in the rejection of background events which could be initiated by cosmic ray collisions, independent decays of two contaminating radioisotopes and other complex background events. This criterion will cause undesired rejection of a triple gamma isotope decay, when the solitary gamma and one of the annihilation gamma pair activate the same detector. It is more desirable however to achieve the sought background rejection. The triple gamma isotope count losses can be calculated from the known geometry of the apparatus and suitable calibration experiments.

The apparatus of the invention implementing the comparison of candidate events and the signature of a known triple gamma isotope is a Coincident Gamma-photon Detector (CGD) with the following general features: a sample containment transparent to the decay gammas, three or more gamma detectors well shielded from one another and intercepting gammas from the sample containment; the fast electronics including means for timing and pulse height analysis; exterior shielding; and a flow of radioisotope depleted gas serving to minimize airborne traces of contaminating radioisotopes. Automated systems of sample transport serving a CGD are prior art.

With the improved background rejection achieved through the combination of method and apparatus, the triple gamma isotopes can be advantageously used as labels for the sensitive quantitation of radioisotopically labeled molecules. Triple gamma isotopes have not previously been utilized for this role. The applications of the invention thus include the quantitations of molecules labeled with multiple gamma isotopes, when background count rejection is accomplished by application of the three above specified criteria. The chemical methods of sample preparation are prior art.

The invention is also useful for quantitations of other isotopes decaying with production of multiple gammas of known energy, i.e. positron emitters and isotopes whose nuclei can rapidly transit through several angular momentum states with accompanying production of gamma-photons. The efficacy of background rejection in these cases is dependent both on the isotope and the environment provided by the containing sample.

These features and advantages of the invention will be further apparent from the following description of the preferred embodiments thereof, which are provided herein for the purpose of disclosure and should be taken in conjunction with the accompanying drawings. It should be understood that various changes and modifications of the preferred embodiments described herein will be apparent to those skilled in the art.

BRIEF DESCRIPTION OF THE DRAWINGS

FIG. 3b is horizontal cross section along line 2—2 of the detector assembly shown in FIG. 3a.

DETAILED DESCRIPTION OF THE COINCIDENT GAMMA-PHOTON DETECTOR

All components of the apparatus are prepared from highly purified materials, so as to minimize gamma producing contaminants.

Figure 2:
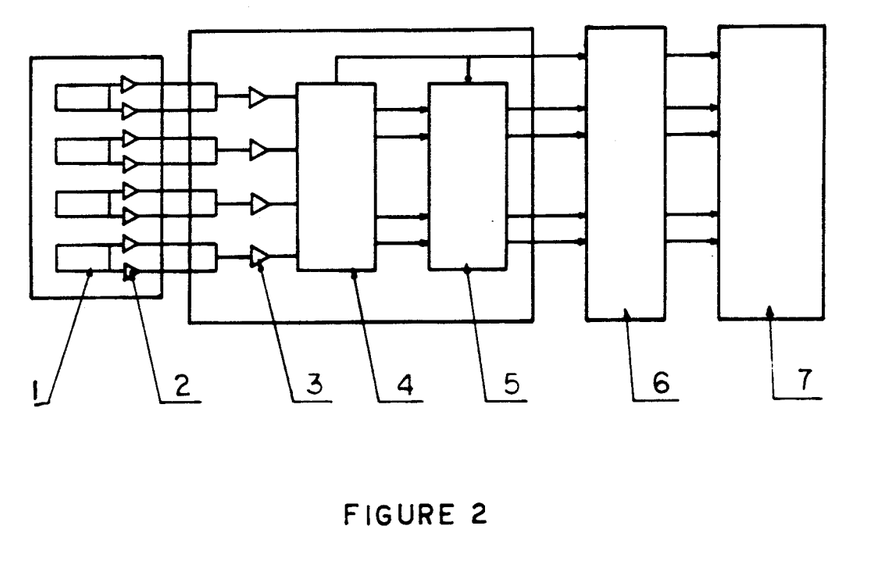
FIG. 2 is a diagram of signal flow in the gamma detectors.

In the FIG. 2 schematic of the low background gamma detector assembly the gammas are absorbed by well-type multicrystals 1, wherein the electronic signal is amplified by low noise preamplifiers 2. The signals are further amplified by shaping amplifiers 3 which are also used as summators. The pulse heights analyzers 4, e.g. analogue-to-digital converters (ADCs) and coincidence circuitry 5 are connected via Programmable Logic Analyzer (PLA) 6 to the appropriate microprocessor 7.

Figure 3A:
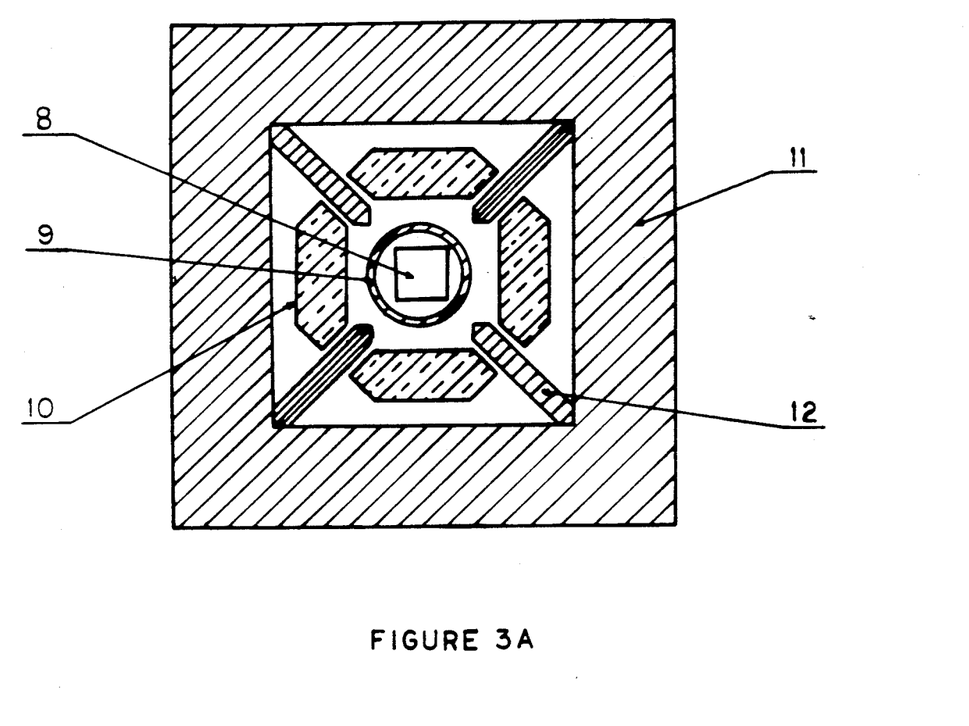
FIG. 3a is a vertical cross section of a typical detector assembly which is a preferred embodiment of the invention having four detectors.
Figure 3B:
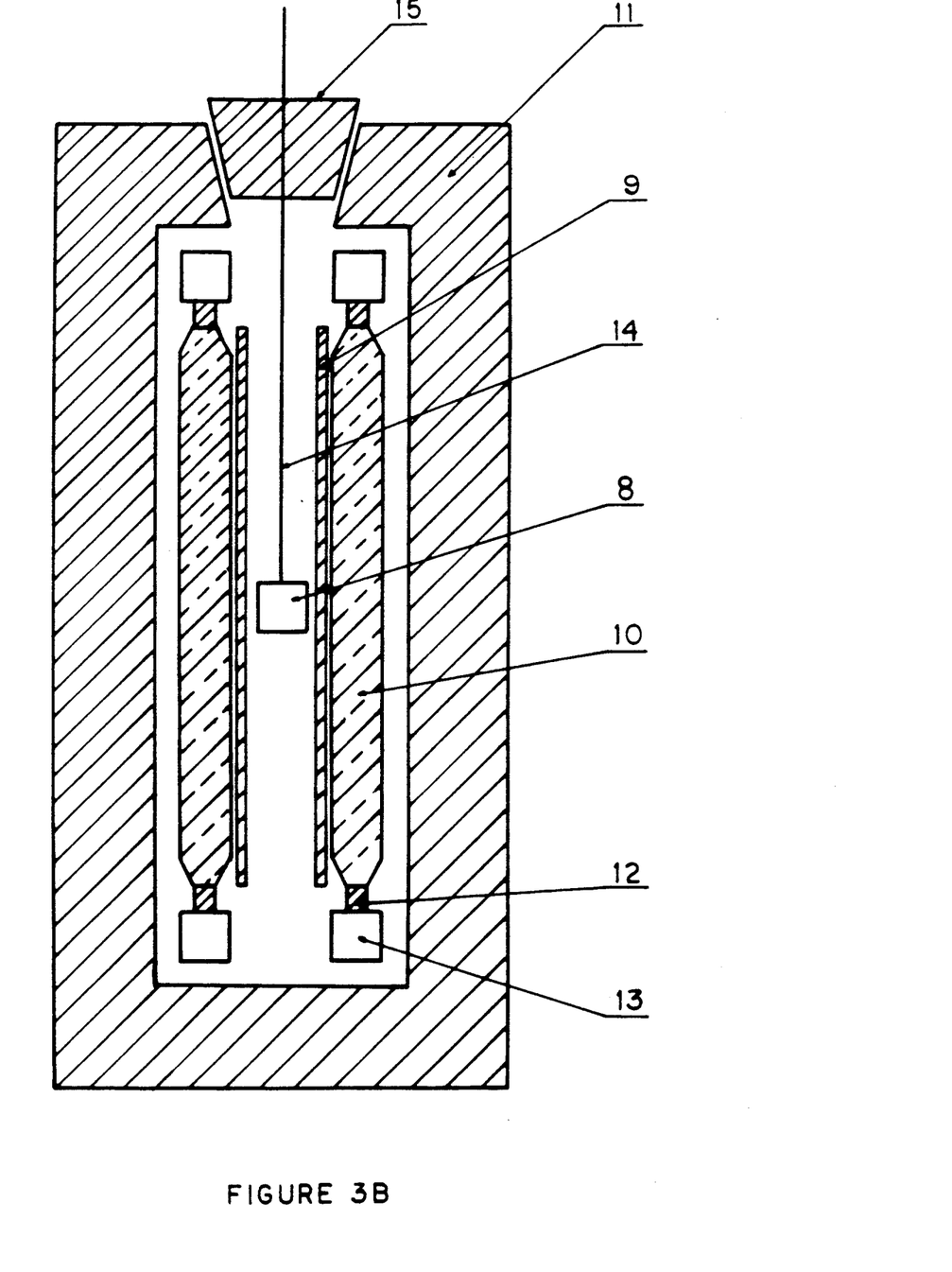

The FIGS. 3a and 3b of the detector chamber illustrate for purposes of clarity cross sections as being of square and elongated shape and having four detectors which is preferable in the practice of the invention. The device could also be of parallelpiped, cylindrical or round construction with a minimum of three equally spaced and separated detectors. In the preferred embodiment each of four scintillators 10 is coupled through two solid state photodetectors 12 to low noise preamplifiers 13. The radioactive sample is in a container 8 made from low atomic number materials. Container 8 is sealed to prevent radioactive dust from contaminating the detector interior. The container is suspended on very high purity, quartz rod 14. The entire assembly is purged from a bottom vent with clean helium gas to eliminate radon and radioactive dusts prior to initiation of counting. The small aperture for sample insertion is blocked by a plug 15 after purging. The sample is positioned within a cylindrical low atomic number metal, e.g. aluminum foil 9. This foil can be simply replaced when an increasing background count indicates contamination. The positrons are predominantly annihilated within the sample and volume circumscribed by the cylinder. Count loses which would often accompany positron annihilation on a scintillator are thus avoided. Due to the low atomic number of the said container and the said foil shield, they are transparent to the gammas of energy less than 300 keV. The gammas are absorbed in the scintillation crystals producing photoelectrons and a resultant low energy photon shower.

As shown in the cross sectional view of FIG. 3b, there are the high density septa 12 are between crystals, to minimize back-scatter of photoelectrons and photons between detectors. The septa have a density preferably greater than 5 g/cc, such as obtained with bismuth, lead, thallium, mercury, gold, copper, tungsten, tantalum, and the like and alloys thereof. The entire detector subassembly is shielded from external radiation by a low radioactive background passive shield 11, constructed to serve as both Faraday cage blocking external electromagnetic pulse noise and external radiation (electrons/photons/neutrons) shield.

Figure 4:
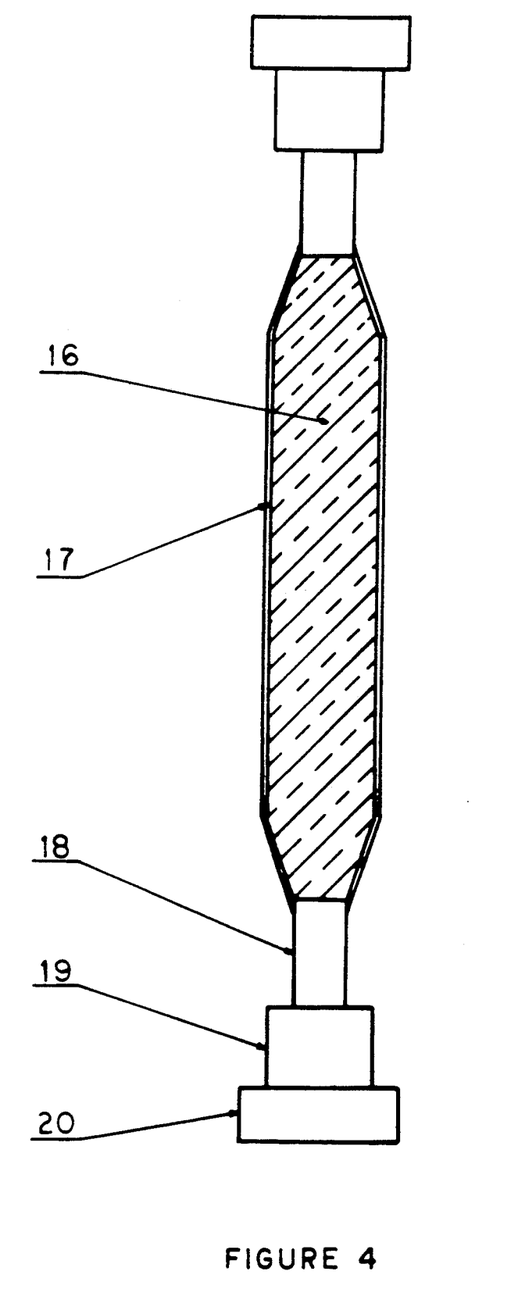
FIG. 4 is an enlarged vertical cross section of a detector subassembly.

In the schematic view of FIG. 4 a scintillator 16 is covered by diffusively reflecting thin layer 17 and coupled to a photomultiplier 18. This reflecting layer limits loses of low energy photons from the photodetector assembly. The photomultiplier base 19 and the low noise fast preamplifier are also present. The photodetectors are optically coupled to the scintillators are preferably narrow gap photodetectors such as mercuric iodide, high purity germanium, and the like. The photomultiplier base 19 and the low noise, fast preamplifier 20 are also presented. In another implementation solid state photodetectors are used, i.e. the scintillators are optically coupled to preferably narrow gap semiconducting photodetectors made of silicon, mercuric iodide, high purity germanium, and the like. The scintillator 16 preferably has a density greater than 4 g/cc and an atomic number greater than 50. Illustrative, but not limiting, are scintillators of bismuth germinate, gadolinium orthosilicates, barium fluoride, cesium iodide, or sodium iodide. Particularly preferred are scintillators with a density greater than 10 g/cc. These particular choices of system components provide some optimization of the system for quantitation of iodine-124 and iodine-126.

Figure 5:
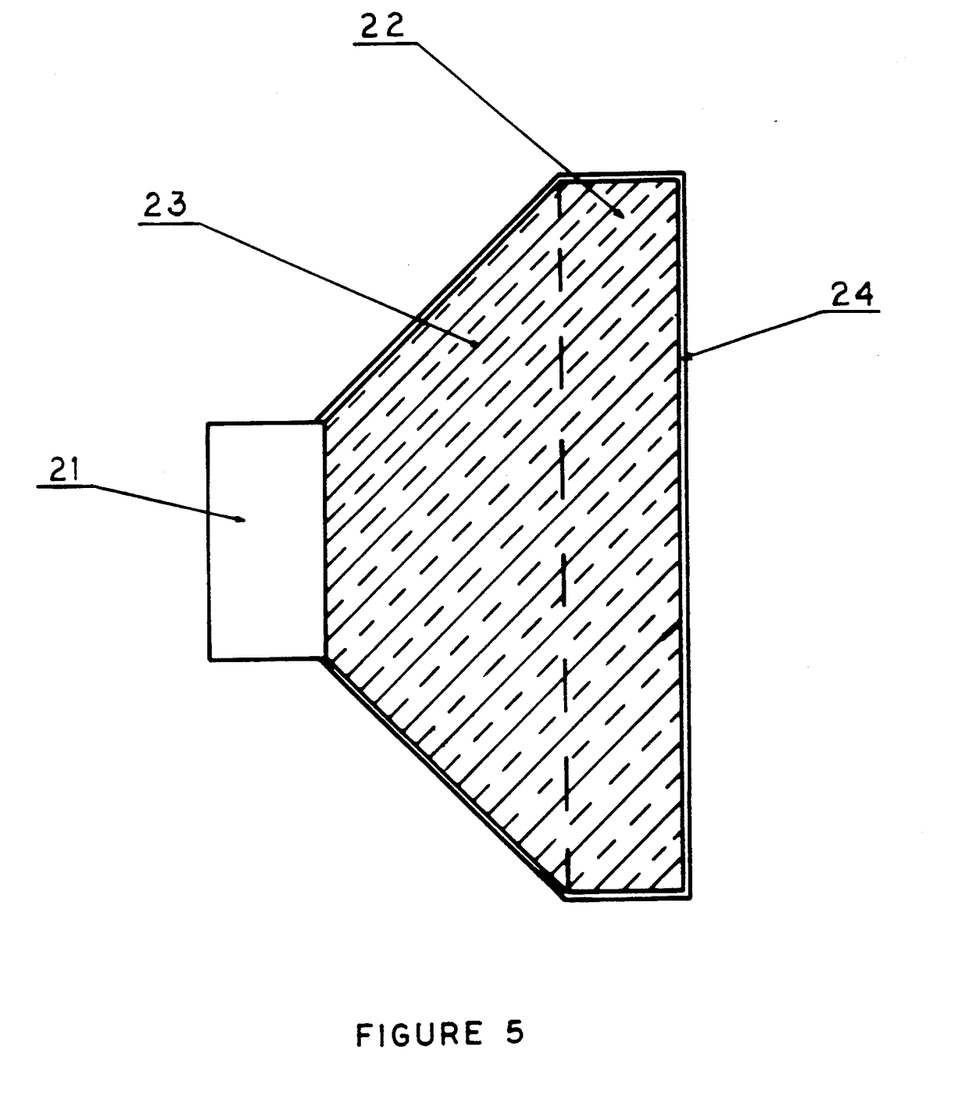
FIG. 5 is a cross-section of a detector subassembly consisting of scintillator, photomultiplier, photomultiplier bases and preamplifier.
Figure 6:
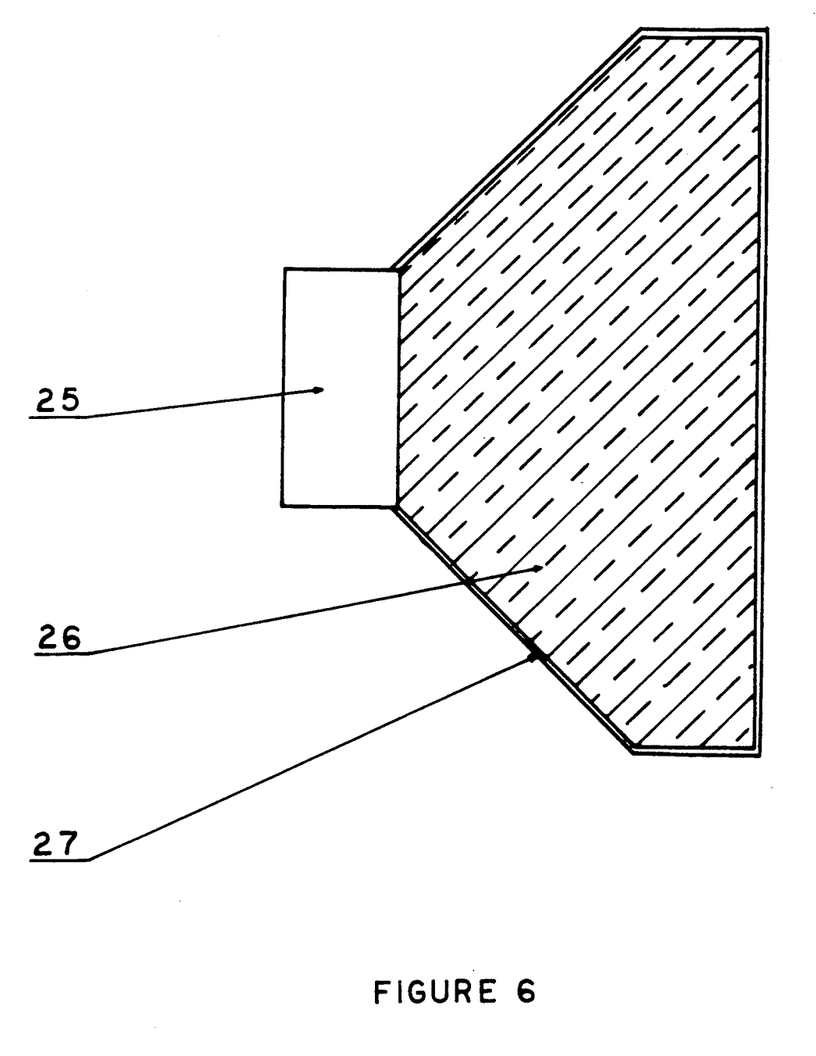
FIG. 6 is a cross-sectional view of another photodetector mounting modification.
Figure 7:
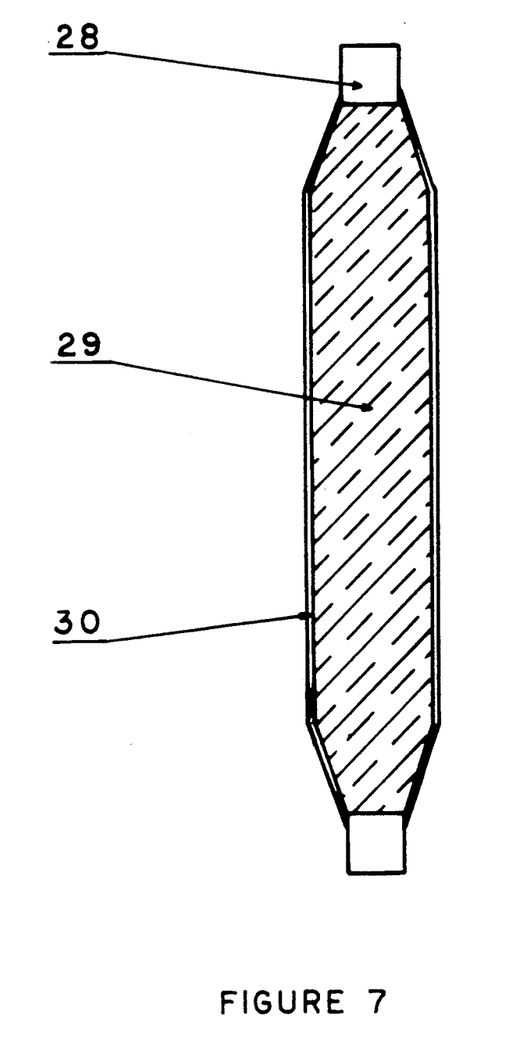
FIG. 7 is a side vertical view of the preferred embodiment of the photodetector mounting used in the gamma detector.

In FIGS. 5-7, there are illustrated various mounting techniques for the fabrication of the photodetectors/scintillator. In FIGS. 5 and 6, the scintillator 22 is mounted to a single solid state photodetector 21 using a fan-shaped optically transparent coupling 23. The side of the assembly which is not adjacent to the solid state photodetector 21 is suitably coated with a diffusing/reflecting layer 24. The dashed line represents in FIG. 5 the division between the non-glass coupler 23 and the scintillator crystal 22, whereas in FIG. 6 there is no dash separation line shown, as the scintillator 26 is formed and shaped to provide the desired "truncated" effect to the end mounts for these particular photodetector/scintillators.

With reference now to FIG. 7, there is shown another alternate construction which is of the preferred arrangement wherein two solid state photodetectors 28 are joined and connected to the scintillator 29 having tapered ends (like those shown in FIG. 6. In a like manner, said scintillator 29 is further provided with a diffusive reflector 30.

Figure 8:
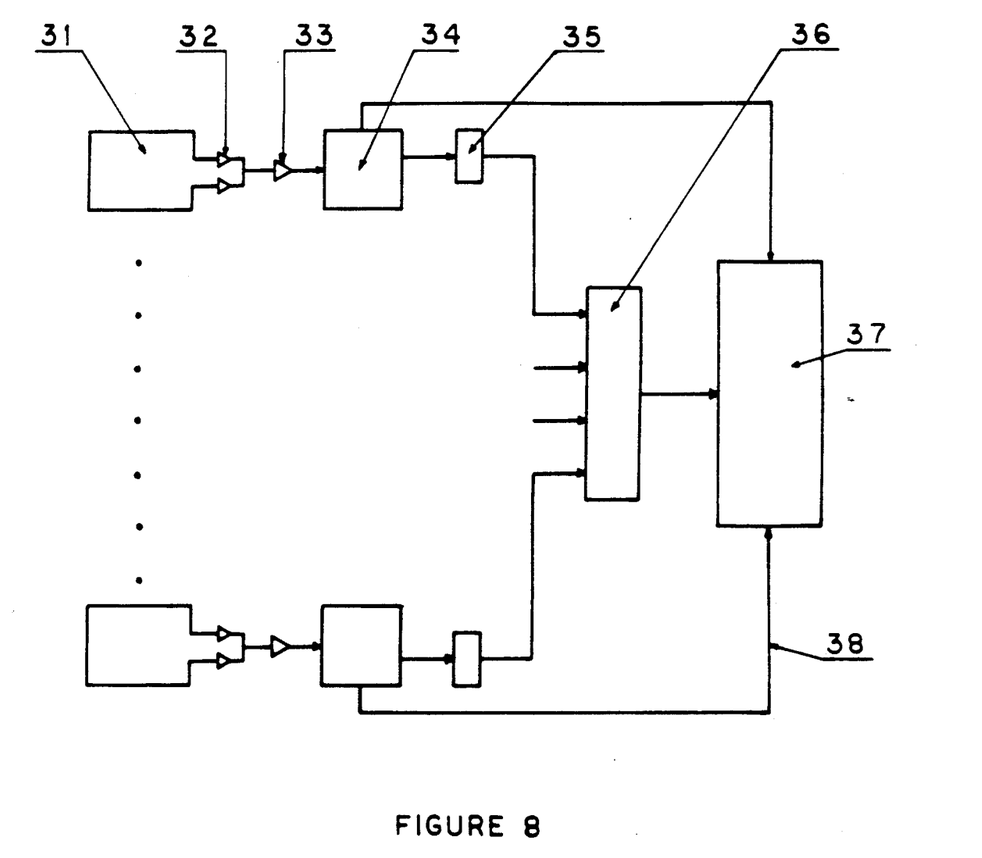
FIG. 8 is a schematic circuit diagram of the fast electronic and data acquisition circuitry.

In FIG. 8 there is shown a schematic circuit diagram of the multichannel electronics and data acquisition circuitry. The signal from the scintillating detector 31 is amplified by a fast preamplifier 32 and shaped by a shaping amplifier 33. The pulse amplitude is then analyzed by a pulse height analyzer 34 and triggers a NIM (or TTL) level pulse in a fast threshold device (single-shot) 35. The output from four single shots is feeding coincidence circuitry 36. All pulse high analyzers 34 and coincidence circuit 36 are communicating with a dedicated microprocessor 37 via eight bites bus line 38. For simplicity only two channels of electronics are depicted whereas in the real device three or more channels will be used.

Referring to FIG. 8, there is shown four scintillation detectors 31 each corresponding to a respective electronics channel, although more or fewer detectors 31 may be implemented in which case a corresponding number of channels will exist. The detectors 31 detect ionizing radiation and output electrical signals. Since the signals output by the detectors 31 are typically low-level signals, they are received by low-noise preamplifiers 32, generally two preamplifiers 32, per channel, which amplify the low-level signals without appreciably degrading the signal-to-noise ratio of the low-level signals. The signals developed by the preamplifiers 32 are received by amplifiers 33, generally one amplifier 33 per channel, which add, amplify and appropriately shape the signals for output to a pulse height analyzer 34. The pulse height analyzer 34 analyzes the signal output by the amplifier 33 to determine the number of occurrences of pulses that fall within a specified amplitude range and outputs a signal to coincidence circuitry 35.

Preferably, three single channel pulse height analyzers can be employed for each channel rather than a single pulse height analyzer 34 for all channels. Thus, a total of twelve single channel pulse height analyzers are used in this alternate embodiment device. In such a case, each single channel pulse height analyzer analyzes the amplified and shaped signal output of its respective amplifier 33 to determine the number of occurrences of pulses that fall within its respective specified amplitude range.

The coincidence circuitry 35 outputs a pulse to a Programmable Logic Analyzer 36 when it receives a specified number of appropriate pulses within an assigned time interval from the pulse height analyzer 34. The Programmable Logic Analyzer 36 analyzes the pulses received form the coincidence circuitry 35 and outputs a signal appropriate for processing by a microprocessor 37. The micro-processor 37 receives the signal from the Programmable Logic Analyzer 36, processes the signal and determines whether to register the analyzed event as a valid count.

FIG. 8 is a block diagram of the electronic circuitry of the present invention which is conventional in design and construction, a more detailed description is deemed unnecessary. In this regard, it should also be understood that other circuit designs may be employed by skilled artisans in lieu of the circuit design shown herein without departing from the scope of the present invention.

Figure 9:
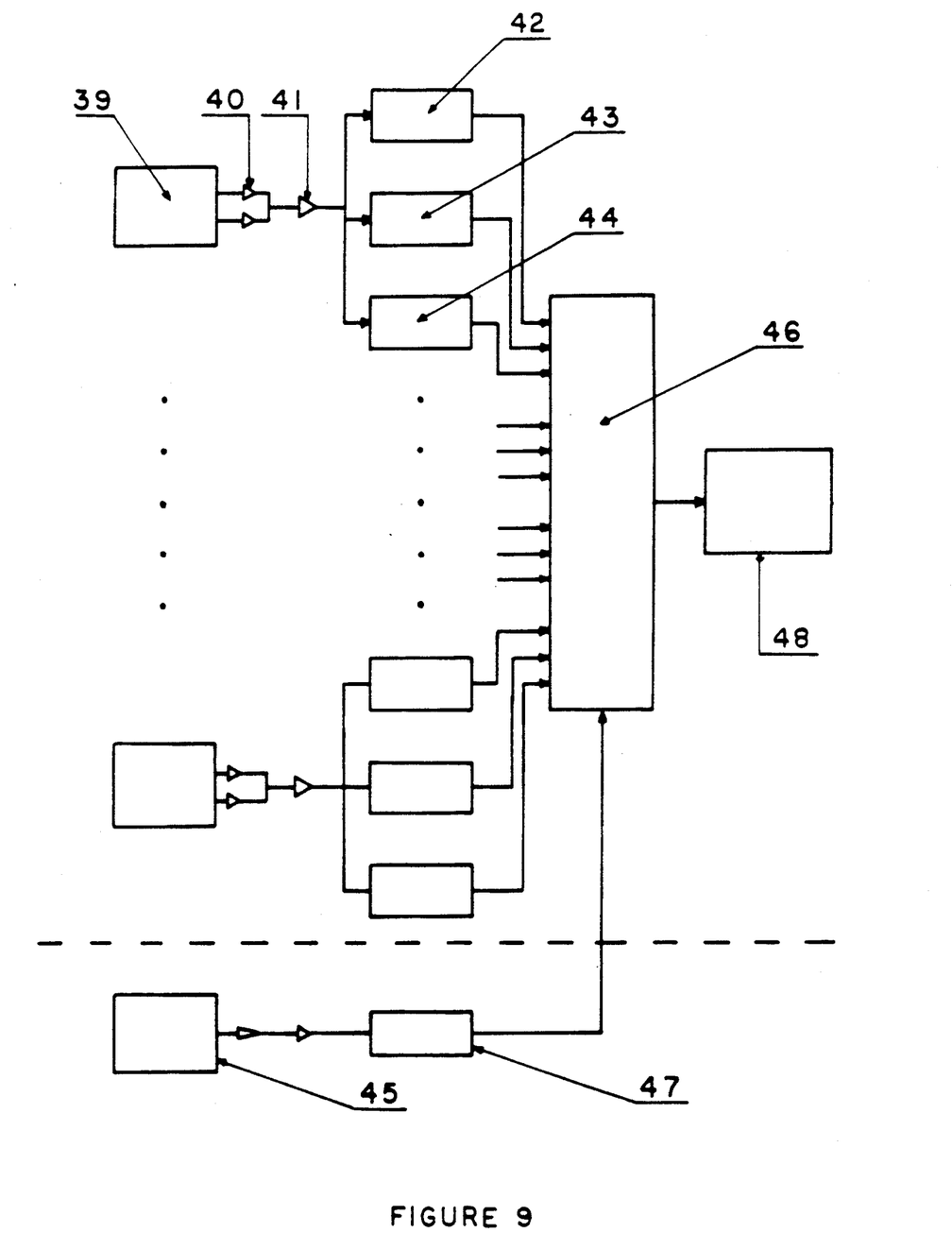
FIG. 9 is a schematic circuit diagram of the electronics realizing a simplified energy discrimination using multiple, adjustable single channel analyzers (SCA).

In FIG. 9 an alternate circuit design is shown having an additional detector with a corresponding preamplifier, amplifier and single channel pulse height analyzer operated in a threshold mode. This detector-analyzer arrangement is mounted externally of the passive shield and outputs a pulse/signal to the programmable logic analyzer which is used to reject background radiation, such as cosmic Rays. Thus, instead of using (three or more costly) high resolution pulse height analyzers, the Programmable Logic Analyzer 46 analyzes the coincidence and value of the output of twelve (much less expensive) single channel pulse height analyzers, and the anticoincidence of the thirteen single pulse height channel analyzer, and then, if desired, may update the count rate of a suitable counter (now shown in FIG. 10) connected to the Programmable Logic Analyzer. Thus, both the coincidence and energy analysis for three of the four counters, and the anticoincidence analysis with input from an external shield detector, are implemented more simply and economically.

In FIG. 9 there is shown a schematic circuit diagram of the preferred embodiment of the multichannel electronics and data acquisition circuitry, specifically set to detect the iodine-126. The signal from the scintillating detector 39 is amplified by a fast preamplifier 40 and shaped by a shaping amplifier 41. It is then split and looked upon by three single channel analyzers (SCA1, SCA2 and SCA3). The SCA1 42 is set for energy of 511 keV ± 10%. SCA2 43 is set for an energy of 600 keV ± 10% and SCA3 44 is set for 1.1 meV ± 10%. If the detected energy is within the SCA range, a short duration TTL level pulse is generated. Thus the output from four scintillation counters is processed by twelve SCA and then analyzed by a Programmable Logic Analyzer (PLA) 46. Optionally, the output of the plastic scintillator 45 is appropriately amplified/shaped and is analyzed by SCA 47 operated in the threshold mode and can be used to reject cosmic rays. Thus, the PLA looks into a coincidence and value of output of twelve SCAs and anticoincidence of thirteen SCAs and then updates the count-rate at counter 48.

Figure 10:
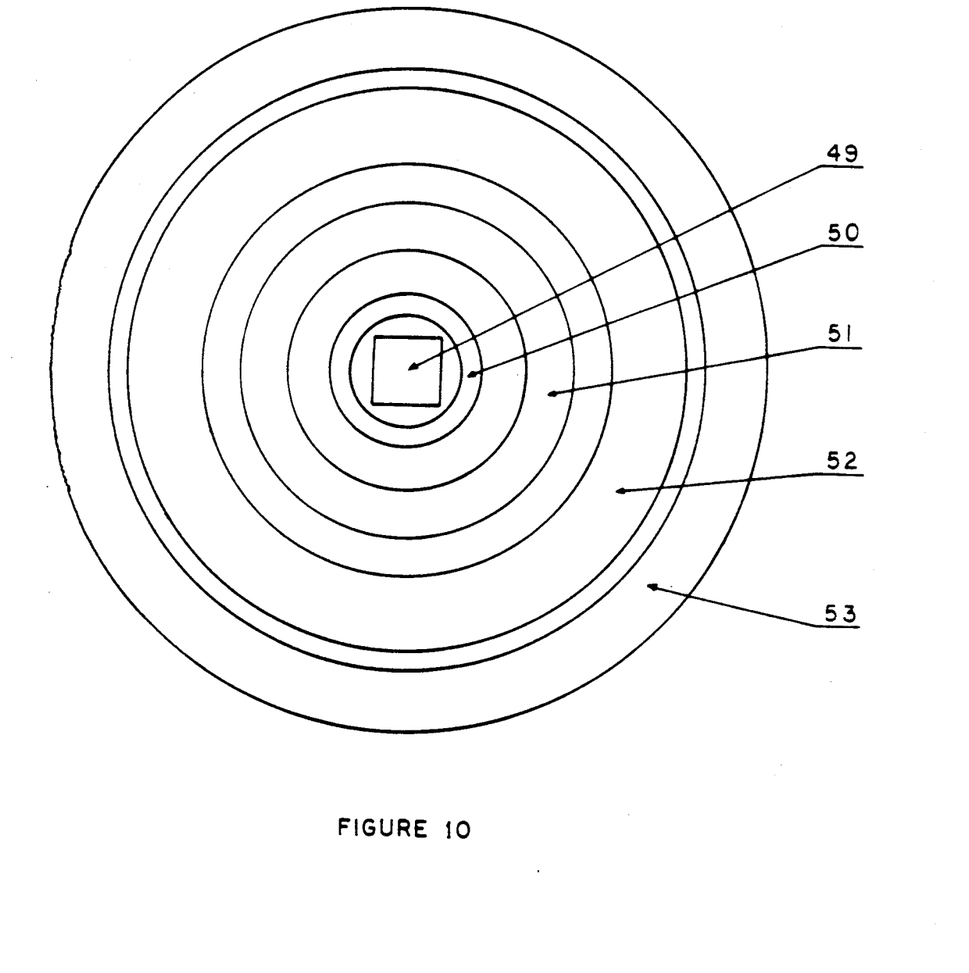
FIG. 10 is a horizontal cross section of the passive/active external radiation shield.

In FIG. 10, there is shown an optional shielding arrangement which may be employed in the practice of the invention. As shown therein, a scintillation counter assembly 49 formed in the same manner as those hereinbefore described, such as shown in FIGS. 1-6, and said assembly; is disposed inside a plastic anticoincidence scintillator 50. Very high purity oxygen free copper (OFHC) is used as an internal part of passive shield 51 and operates to stop all photons with $E \leq 100$ keV, including K-edge photons from lead. A further thick ring of high purity lead 52 stops the majority of high energy photons ($E \leq 100$ keV) as well as all charged particles with $E \leq 10$ meV. Lastly, an external ring of boron loaded plastic 53 is used to stop the majority of low energy neutrons. Although a cylindrical shape is shown, other geometrical shapes may be employed for construction of the device, such as cylindrical, square or rectangular, parallelpiped, and the like.

Accordingly, the present invention as described and shown herein, is adapted to fulfill the objects and attain the ends, results and advantages described as well as those inherent therein. However, it should be apparent that other modifications and changes in the details of construction and arrangement of parts may be made as readily suggested to those skilled in the art, all without departing from the spirit of the invention and the scope of the claims attached hereto and forming a part of this application.

We claim:

1. In the method of quantitating a sample of a known radioisotope decaying with production of multiple gamma-photons, the improvement in background rejection achieved by characterizing candidate decay events with at least three gamma detectors and rejecting candidate events distinguished from those of the said radioisotope through failure of at least one of the following criteria:
   a. the coincident detection of the candidate gamma-photons;
   b. having the detected energies and total energy deposition attributable to the said isotope;
   c. having an angular distribution of energies in detectors attributable to said gamma-photons of the said isotope.

2. The method of claim 1, wherein the scintillator of each gamma detector has a density greater than 4 g/cc and are of material with an atomic number greater than 50.

3. The method of claim 2, wherein the scintillators are chosen from the group consisting of bismuth germanate, gadolinium orthosilicate, cesium iodide, barium fluoride, and sodium iodide.

4. The method of claim 1, wherein at least three photodetectors are optically coupled to the said three scintillators.

5. The method of claim 4, wherein the photodetectors are selected from the group consisting of photomultipliers or semiconducting photodetectors based on silicon, mercuric iodide and germanium.

6. The method of claim 1, wherein the photodetectors are mechanically separated and shielded from each other by a material with a density greater than 5 g/cc.

7. The method of claim 6, wherein the separating material is selected from the group consisting of bismuth, lead, thallium, mercury, gold, copper, tungsten, tantalum, and mixtures and alloys thereof.

8. The method of claim 1, wherein the radioisotope is selected from the group consisting of emitters of:
   a. a positron and a gamma-photon concurrently,
   b. positrons detectable by annihilation photons, and
   c. multiple gamma-photons concurrently.

9. The method of claim 8, wherein the radioisotope is iodine-124 or iodine-126.

10. The method of claim 8, wherein the radioisotope is selected from the group consisting of germanium-69, selenium-73, bromine-76 and bromine-77.

11. The method of claim 1, wherein molecules to be quantitated are covalently or non-covalently coupled to the said radioisotopes.

12. The method of claim 11, wherein the said molecules are proteins, carbohydrates, ribonucleic acids or deoxyribonucleic acids.

13. The method of claim 12, wherein the radioisotopically labeled molecules are reagents for radioimmunoassay systems.

14. An apparatus for quantitating decays of multiple gamma producing isotopes and comprising a central sample surrounded by an inner protective foil shield of an atomic number below 13, which in turn is surrounded by at least three crystal scintillators, said scintillators separated on each side by material with a density greater than 5 g/cc, said scintillators having directly mounted on at least one end a photodetector and wherein the at least three scintillators mounted with photodetectors are surrounded by a continuous shield from external radiation, said shield having a removable plug for insertion or withdrawal of the central container and vents for purging gases.

15. The apparatus according to claim 14, wherein the septa material is selected from the group consisting of bismuth, lead, thallium, mercury, gold, copper, tungsten, tantalum, and mixtures and alloys thereof.

16. The apparatus of claim 14, wherein the scintillators have a density greater than 4 g/cc and are of material with an atomic number greater than 50.

17. The apparatus of claim 16, wherein the scintillators are chosen from the group consisting of bismuth germanate, gadolinium orthosilicate, cesium iodide, barium fluoride, and sodium iodide.

18. The apparatus of claim 14, wherein the at least three photodetectors are optically coupled to at least three separate scintillators are of the semiconducting type.

19. The apparatus of claim 18, wherein the photodetectors are selected from the group consisting of mercuric iodide and germanium.

20. The apparatus of claim 14, wherein said photodetectors are mounted on both ends of each of said at least three scintillators.

21. The apparatus of claim 20, wherein said photodetectors are coupled to low noise preamplifiers.

22. The apparatus of claim 14, wherein said crystal scintillators are covered by a diffusively reflecting material except at the surface adjoining the photodetectors.

23. The apparatus of claim 14, wherein the ends of said crystal scintillators are elongated and tapered at opposite ends thereof.

24. The apparatus of claim 21, including electronic circuitry means having a shaping amplifier/summator connected to the preamplifiers and to at least one high resolution pulse height analyzer, and coincidence means coupled to said at least one pulse height analyzer and a programmable logic analyzer which in turn is the input to a microprocessor.

25. The apparatus of claim 24, wherein for each of said four scintillators and shaping amplifiers/summators, there are three single channel analyzers set for predetermined energy levels of 511 keV, 600 keV and 1.1 meV within windows of ±10% providing for optimal quantitation of iodine-124.

26. The apparatus of claim 24, wherein said at least one pulse height analyzer is operated in a threshold made so as to reject background radiation.

27. The apparatus of claim 21, wherein a plurality of shields are disposed around said test sample, and at least one being of high purity lead or lead alloy, and another comprising a boron loaded plastic.

28. The apparatus of claim 27, further including a high purity copper shield disposed between said high purity lead shield and said scintillators.

29. The apparatus of claim 25, wherein the detector serving as an active shield is placed between high purity copper/lead shield and the boron loaded plastic.

30. The apparatus of claim 29, wherein the said active shield is a photodetector with a plastic scintillator.

* * * * *